(12) United States Patent
Leconte et al.

(10) Patent No.: US 8,819,775 B2
(45) Date of Patent: Aug. 26, 2014

(54) SECURE METHOD OF ACCESSING AN INFORMATION SYSTEM OF AN AIRCRAFT

(75) Inventors: Bertrand Leconte, Toulouse (FR); Romain Pochet, Castelginest (FR)

(73) Assignee: Airbus Operations, Toulouse (FR)

( * ) Notice: Subject to any disclaimer, the term of this patent is extended or adjusted under 35 U.S.C. 154(b) by 460 days.

(21) Appl. No.: 12/901,040

(22) Filed: Oct. 8, 2010

(65) Prior Publication Data

US 2011/0093918 A1 Apr. 21, 2011

(30) Foreign Application Priority Data

Oct. 15, 2009 (FR) ..................................... 09 57248

(51) Int. Cl.
   G06F 7/04 (2006.01)
   G06F 12/14 (2006.01)
   H04L 29/06 (2006.01)
   H04L 9/32 (2006.01)
   G06F 21/62 (2013.01)

(52) U.S. Cl.
   CPC ............... H04L 63/08 (2013.01); H04L 63/10 (2013.01); G06F 21/6236 (2013.01); G06F 21/6218 (2013.01); H04L 63/1416 (2013.01); H04L 63/126 (2013.01); H04L 9/3244 (2013.01)
   USPC ...... 726/2; 726/21; 726/22; 726/27; 713/161; 713/168

(58) Field of Classification Search
   CPC ..... H04L 63/08; H04L 63/10; H04L 63/1416; H04L 63/126; H04L 9/3244; G06F 21/6236; G06F 21/6218
   USPC ..................... 726/2, 21, 22, 27; 713/161, 168
   See application file for complete search history.

(56) References Cited

U.S. PATENT DOCUMENTS

| 7,078,886 B2 * | 7/2006 | Bregaint et al. ................. 324/66 |
| 2003/0052225 A1 * | 3/2003 | Butzlaff ..................... 244/118.5 |
| 2003/0054686 A1 * | 3/2003 | Pappas et al. ................. 439/535 |
| 2007/0028095 A1 | 2/2007 | Allen et al. |
| 2007/0214360 A1 | 9/2007 | Royalty |
| 2007/0264953 A1 * | 11/2007 | Srinivasan et al. ......... 455/186.1 |
| 2009/0187976 A1 * | 7/2009 | Perroud et al. ................... 726/4 |
| 2010/0098243 A1 * | 4/2010 | Chopart ......................... 380/28 |

FOREIGN PATENT DOCUMENTS

| EP | 1 610 199 A1 | 12/2005 |
| EP | 1 855 439 A2 | 11/2007 |
| WO | WO 2008/042046 A1 | 4/2008 |

OTHER PUBLICATIONS

French Search Report dated May 27, 2010 in French Patent Application No. 0957248 (with translation).

* cited by examiner

*Primary Examiner* — Aravind Moorthy
(74) *Attorney, Agent, or Firm* — Oliff PLC

(57) ABSTRACT

In the method of accessing an information system of an aircraft the system receives an authenticator request from a connector of the aircraft; the system determines whether the connector presents a predetermined characteristic; and in the event that the system determines that the connector does indeed present the predetermined characteristic, the system sends an authenticator to the connector. Provision is also made for: the system receives an authenticator the system determines whether the authenticator is valid; and in the event that the system determines that the authenticator is indeed valid, the system authorizes access to the system from a connector of the aircraft from which the authenticator was sent.

11 Claims, 2 Drawing Sheets

SECURE METHOD OF ACCESSING AN INFORMATION SYSTEM OF AN AIRCRAFT

FIELD OF THE INVENTION

The invention relates to accessing the information system of an aircraft.

BACKGROUND OF THE INVENTION

Nowadays, new aircraft often incorporate management of their own maintenance, including documentation relating thereto. For this purpose, the information system on board the aircraft includes applications that enable maintenance procedures to be consulted, certain breakdowns to be anticipated, and certain maintenance operations to be performed.

In order to reduce occupation of the cockpit and to facilitate maintenance operations, computer connectors in the form of jacks are made available in other portions of the aircraft to enable a portable maintenance computer to be connected thereto so as to access said applications. These jacks are installed in confidence zones and are therefore accessible only to authorized persons.

In order to further facilitate maintenance, it is now desired for it to be possible, perhaps optionally, to have jacks available that are situated in zones that are also accessible to the public, i.e. to the passengers of the airplane. Unfortunately, such jacks represent entry points for a potential attack on the information system of the airplane, so it is desirable to protect access thereto.

OBJECT AND SUMMARY OF THE INVENTION

An object of the invention is to protect access to said jacks in order to maintain restricted access to the information system of the airplane.

A system achieving this object needs preferably to satisfy four other criteria.

Firstly, it must be an authentication method that does not require a user account database to be kept up to date in the airplane or in the maintenance computer. This condition is specific to the world of aviation. It is very difficult to update an airplane after each flight without having an impact on its availability. Consequently, such a solution using a database of people who are authorized to be on board needs, a priori, to be excluded, since it is not effective if the airplane is not updated frequently.

The authentication method must not require an additional removable medium (USB key, smart card, dongle having a one-time password (OTP) or token, . . . ) since these are very complicated to manage for a company having a fleet of airplanes. Such utilization requires complicated management of the life cycle of the medium (initialization, recording losses, . . . ) and cannot be envisaged in practice in the context of airplane maintenance, and furthermore is considered by companies as being too expensive.

The authentication method must be compatible with the environmental constraints on maintenance. It must be capable of being implemented under all maintenance conditions and must therefore be compatible with working at night, in bad weather, in a dirty environment, in a remote zone, etc. For example, the fact that maintenance operations can be dirtying excludes any authentication solution based on fingerprints.

Finally, the authentication method must be considered as being "strong", i.e. capable of withstanding an attacker having a very high level of computer competence. The system that needs to be protected is critical. In the field of authentication systems, authentication is said to be "strong" if it combines two authentication elements or factors selected from the following: what the entity under consideration knows, what the entity under consideration possesses, what the entity is, and what the entity knows how to do.

For this purpose, in a first aspect of the invention, a method is provided for accessing a computer system of an aircraft, wherein:

the system receives an authenticator request from a connector of the aircraft;
the system determines whether the connector presents a predetermined characteristic; and
in the event that the system determines that the connector does indeed present the predetermined characteristic, the system sends an authenticator to the connector.

In a second aspect of the invention that is compatible with the first aspect, a method is provided for accessing an information system of an aircraft, wherein:

the system receives an authenticator;
the system determines whether the authenticator is valid; and
in the event that the system determines that the authenticator is indeed valid, the system authorizes access to the system from a connector of the aircraft from which the authenticator was sent.

The predetermined characteristic may relate to the fact that the connector is located in a zone of the aircraft that is of a predetermined type, in particular a zone that is associated with a certain level of security, such as a restricted-access zone.

The invention takes advantage of the fact that various safety measures already exist around airplanes for limiting access to certain sensitive zones. This applies to the cockpit that contains measurement instruments and terminals for accessing the information system of the airplane. Access to such sensitive zones is limited to a list of authorized people.

The invention satisfies the above-mentioned preferred conditions for the following reasons.

It does not require management of on-board user accounts. The authenticators may be generated on request and there is no need to store information about authorized personnel in the on-board information system in order to implement the invention.

The method of the invention does not require a removable medium to be used since the authenticator may be recovered in the maintenance terminal, e.g. on it being connected in a restricted access zone. There is therefore no need for any removable medium to enable the maintenance operator to be authenticated.

The invention makes it possible to implement the principle consisting in initially connecting the terminal in a restricted access zone before making use of it in any other zone. It is therefore compatible with the working constraints on maintenance teams. Furthermore, the solution can be used under any working environmental conditions (dirty, cold, rain, night, . . . ).

Finally, the invention may be implemented in such a manner as to combine two authentication factors: what the entity knows how to do and what the entity possesses. To be authenticated, the maintenance operator must initially access a zone that presents the predetermined characteristic (which corresponds to "what I know how to do") in order to recover the authenticator. Provision may be made for the operator to make use thereof within a limited period of time (what "I possess"). This authentication solution can thus be considered as being "strong".

In the second aspect, there is no need for the system to determine whether the connector represents a predetermined characteristic, e.g. relating to the fact that the connector is or is not to be found in an aircraft zone of a predetermined type, in particular a zone associated with a certain level of security such as a restricted access zone. This aspect may be implemented without the system for undertaking such a determination. In the second aspect, the system may authorize access to the system even if the connector is not in such a zone.

Advantageously, the system compares the received authenticator with an authenticator stored in the system.

Advantageously, the system triggers a counter measuring a time interval that has elapsed since a predetermined event, preferably the most recent disconnection from the system of a terminal that sent the authenticator, with the validity of the authenticator depending on the state of the counter.

Preferably, the system eliminates the counter as soon as the time intervals exceeds a predetermined value.

Advantageously, the system stores the authenticator.

Preferably, the system eliminates the authenticator when a predetermined event occurs, for example if the time interval exceeds a predetermined value.

Advantageously, the reception, determination, and authorization steps form a series of steps that are executed several times.

In a third aspect of the invention, the invention also provides an aircraft that includes an information system suitable for:
  on receiving an authenticator request from a connector of the aircraft, determining whether the connector presents a predetermined characteristic; and
  in the event that the system does indeed determine that the connector presents the predetermined characteristic, sending an authenticator to the connector.

In a fourth aspect of the invention that is compatible with the third, the invention also provides an aircraft that includes an information system suitable for:
  on receiving an authenticator, determining whether the authenticator is valid; and
  in the event that the system determines that the authenticator is indeed valid, authorizing access to the system from a connector of the aircraft from which the authenticator was sent.

The invention also provides a method of accessing an information system of an aircraft, wherein:
  a terminal sends an authenticator request to the system from an aircraft zone of a predetermined type;
  the terminal receives and stores the authenticator;
  the terminal is disconnected from the system; and
  the terminal, when once more connected to the system, sends the authenticator to the system.

Advantageously, prior to sending the request, the terminal determines whether an authenticator is stored in the terminal.

Preferably, the sending of the request is initiated by automatic means.

Advantageously, the sending of the authenticator is initiated by automatic means.

Preferably, the terminal triggers a counter measuring an interval of time that has elapsed since a predetermined event, preferably a most recent disconnection of the terminal from the system, with the validity of the authenticator depending on the state of the counter.

Advantageously, the terminal eliminates the authenticator when a predetermined event occurs.

The invention also provides a terminal for accessing an information system of an aircraft, the terminal including means suitable for:
  sending an authenticator request to the system from an aircraft zone of a predetermined type;
  receiving and storing the authenticator; and
  sending the authenticator to the system.

The invention also provides a computer program including code instructions suitable for controlling execution of one or more steps of a method of the invention when it is used on a computer.

The invention also provides a data recording medium including such a program stored in recorded form.

Finally, the invention provides making such a program available on a telecommunications network to be enable it to be downloaded.

BRIEF DESCRIPTION OF THE DRAWINGS

Other characteristics and advantages of the invention appear from the following description of an embodiment given by way of non-limiting example and with reference to the accompanying drawings, in which.

MORE DETAILED DESCRIPTION

The general principle of the present implementation of the invention is described below. That is followed by implementation details in variants, and then there is a description of the various steps of a particular implementation.

Figure 1:
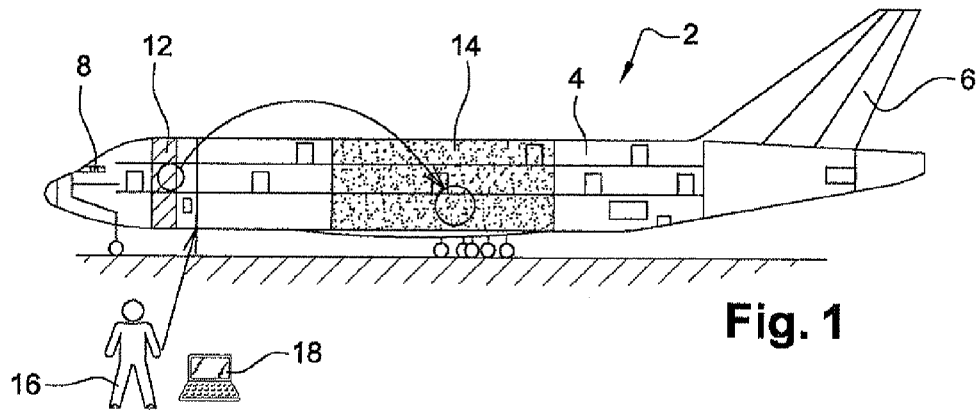
FIG. 1 is a diagrammatic side view of an airplane of the invention.

The aircraft of the present invention is shown in FIG. 1. Specifically it is an airplane 2 having a fuselage 4, wings (not shown) and a tail fin 6. The airplane has a cockpit 8. The airplane includes an information system 10 comprising a plurality of computers connected to one another by an onboard communications network 24. It is possible to connect to the network and to the system via connectors or jacks 11 available in various zones of the airplane.

These zones are classified herein in two categories or types. A distinction is thus made between zones of a first type such as zones situated in the portion 12 of the airplane of FIG. 1 and zones of a second type such as zones situated in the portion 14 of the airplane. The zones of the first type are close to the cockpit and generally situated at the front of the fuselage, whereas the zones of the second type are situated behind the zones of the first type and include the cabin that is to be occupied by the passengers of the airplane, e.g. on two decks one situated above the other. In the present example, the zones of the first type are restricted-access zones unlike the zones of the second type. This means that the level of security associated with the zones of the first type is higher than that associated with the zones of the second type. Thus, the zones of the second type are physically accessible to any person on board, including passengers, whereas the zones of the first type are physically accessible only to certain authorized people such as the flight crew or maintenance personnel. In spite of this possibility of physical access, the invention seeks to reserve access via the zones of the second type to certain people only, such as maintenance operators.

In summary, the method is implemented as follows. While in a zone 12 of the first type, a person such as an operator 16 involved with maintenance begins by using a terminal such as a maintenance portable computer 18 to obtain an electronic authenticator 30. Specifically, this authenticator consists in a ticket and it constitutes proof that the operator is authorized to access said zone.

The operator 16 then goes to a zone 14 of the second type, e.g. the passenger cabin. The terminal 18 is then connected to the airplane computer system via a jack 11 in said zone. For this purpose, the electronic ticket 30 is presented in order to authenticate the terminal and give it access to the information system 10.

In order to improve the level of security of this solution, the ticket 30 is valid for a limited length of time only. Thus, once a predetermined period has elapsed, the ticket is invalid and the authentication system for receiving it will reject any access request from an information system having the ticket.

Conversely, so long as the ticket is valid, the operator 16 may move about and make successive connections to different jacks 11 for accessing the information system regardless of whether the jacks are in a zone of the first type or of the second type. In particular, the operator may connect successively to a plurality of jacks situated in zones of the second type (free-access zones) without any need, meanwhile, to return to the restricted access zone.

Figure 2:
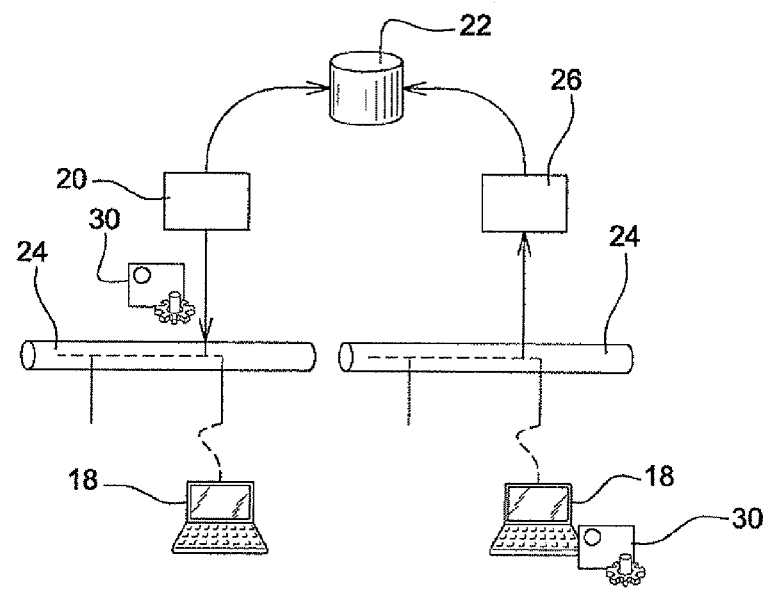
FIGS. 2 and 3 are diagrams showing the implementation of the method of the invention within the airplane of FIG. 1.

In order to implement the method, the on-board information system 10 includes in particular a module constituting a ticket manager 20 for the purposes of creating tickets 30, dispensing them, managing their validity durations, and finally deleting them. It also includes a module forming an authentication server 26 for verifying the validity of a ticket and for authorizing access to the information system. With reference to FIG. 2, the ticket manager 20 and the authentication server 26 are each connected to a ticket database 22 of the information system and also to the communications network 24. The ticket manager and the authentication server may be software modules performing the above-mentioned functions that are described in greater detail below.

The main steps of the method of the invention are described below together with various possible implementations.

A first main step is creating the ticket 30. This creation takes place in the information system 10. Provision may be made for it to be automatic, i.e. initiated by means that are automated, or on the contrary by means that are triggered by the operator 16, or by a third party.

Having the information system generate tickets automatically has the advantage of limiting the actions needed before going into the free-access zone. For example, the mere fact of connecting the terminal 18 to a jack of the information system may trigger the creation of a ticket for the terminal.

Conversely, generating tickets on demand has the advantage of not creating tickets unless they are necessary. Furthermore, with such a solution, the operator 16 is made aware that security is being put into place since is up to the operator to make the request prior to going into the free-access zone.

An alternative consists in generating the ticket 30 automatically when the maintenance terminal requests that from a jack in the restricted access zone, and the request is performed automatically on connection of the terminal to the information system after verifying that the terminal does not already contain a ticket.

The ticket manager 20 must make it impossible to predict the ticket. It must not be possible to create the ticket independently of the information system. An attacker must not be able to reuse a ticket successfully, i.e. to access the system by presenting a ticket that has already been used and that has expired.

Another main step is recovering the ticket 30. Once the ticket has been created, it must be recovered by the terminal 18. As with ticket creation, it is possible to envisage two modes of recovering a ticket, i.e. an automatic mode and a request mode. If it is preferred for the operator 16 to be involved in the access-request process, then the request solution is preferred. Otherwise, speed and ease of use are preferred and the ticket is recovered automatically as soon as the terminal is connected, i.e. ticket recovery is initiated by automatic means, e.g. by the terminal itself.

Another important step is storing the ticket. Specifically, the ticket is stored in the database 22 of the airplane and is duplicated in the terminal 18 of the operator.

Managing the duration of ticket validity also constitutes an important step that is preferred in the present example. This management may be performed in three ways. Either the ticket contains its own time counter in the maintenance terminal, or the information system 10 has a time counter associated with each ticket, or else the system has such a time counter associated with the ticket and the terminal 18 also manages internally a time counter for its ticket.

Of these three solutions, the first has the drawback of potentially being corrupted. It is possible to envisage directly modifying the ticket on the terminal so that the ticket remains valid beyond the intended duration. The second solution corrects the problem of corruption, given that validity is verified only by the airplane information system and the ticket database 22 is protected against attack. The third solution retains this advantage and also limits the number of tickets that need to be verified. The terminal 18 takes charge of modifying the state of its ticket (valid state or non-valid state) on the basis of its own counter. This enables deletion of the ticket to be managed locally on the terminal 18.

Once the operator is connected and authenticated on the information system 10 via the terminal 18, it is preferable to ensure that a particular working session is not interrupted as a result of the ticket expiring. That is why, specifically, the duration of the validity is counted down solely when the terminal 18 is disconnected from the system 10. Consequently, when the operator disconnects the ticket 18 from the jack that was connecting it to the system 10, the terminal triggers a counter for measuring the time interval that elapses from said disconnection. In order to be valid, the next connection to a jack of the information system needs to take place before the counter has reached a predetermined duration, e.g. one hour. If the terminal 18 is newly connected to the information system from a zone of type two after this period has elapsed, then the operator needs to go back to the zone of the first type in order to request a new authenticator.

Yet another step is presenting the ticket. In the present example, the airplane information system 10 authenticates the terminal 18 on the basis of the ticket it presents. This thus involves authentication by comparing the ticket presented by the terminal 18 with the ticket that is to be found in the database 22. Two modes of implementation can be envisaged for this purpose, automatic mode and request mode. Once more, if it is preferred for the operator 16 to be involved in the authentication process, then it is better to use the solution in which the ticket is presented on a request being made by the operator. Conversely, if speed and ease of use are preferred, then it is better for the presentation of the ticket to the information system to be initiated by automatic means as soon as the terminal 18 is connected to the network 24. Furthermore, the validity of the ticket is verified while the system 10 is authenticating the terminal 18.

Finally, another important step is deleting the ticket. Once the ticket is no longer valid, it is preferred in particular to ensure that it is eliminated. Two modes of implementation can be envisaged for this purpose. Either the ticket is eliminated solely from the database 22, or else the ticket is eliminated from said database and from the terminal 18. The advantage of the second solution is that the terminal does not conserve an invalid ticket which would in any event be rejected during authentication via the airplane authentication server. This avoids pointlessly occupying memory in the terminal.

Figure 3:
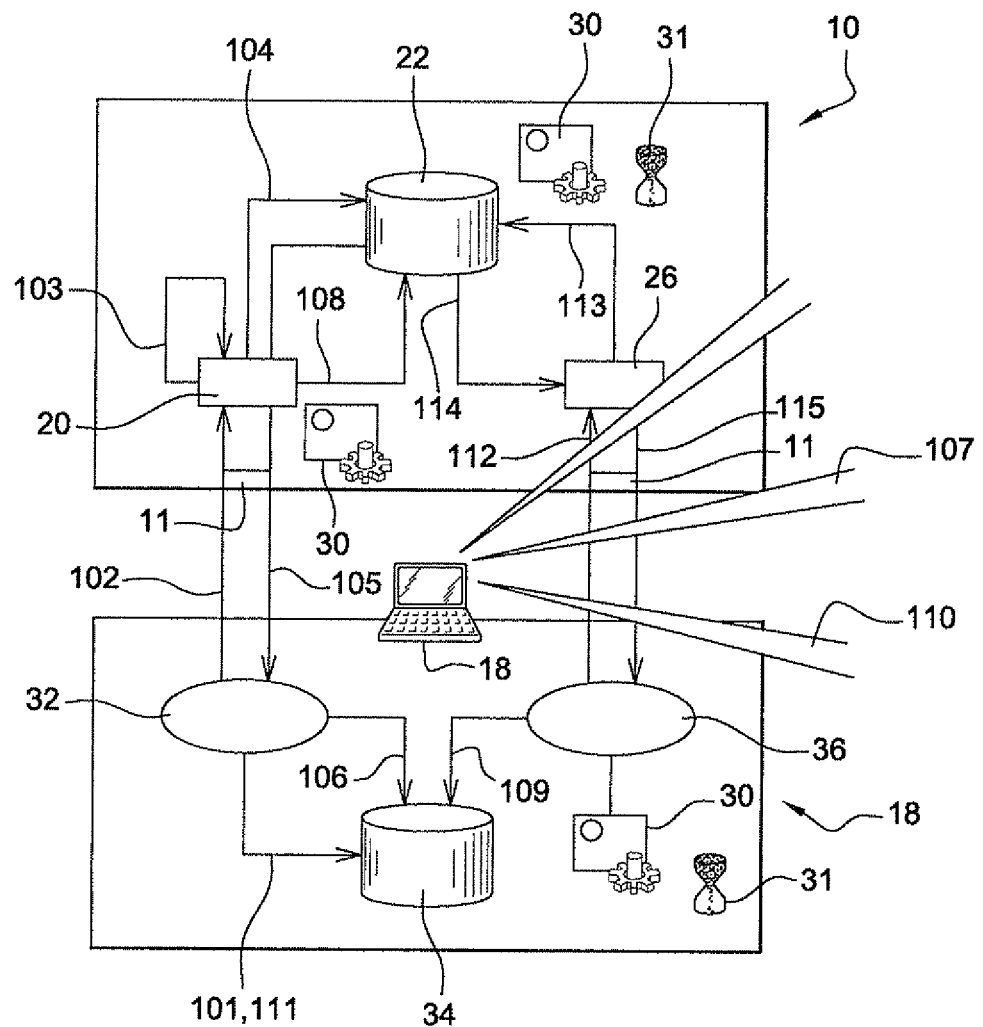

There follows a description of a detailed example of implementing the method of the invention, given with reference to FIG. 3. The implementation described corresponds to preferring automatic interactions between the information system 10 of the airplane 2 and the terminal 18.

The terminal 18 has a module 32 constituting a ticket request service suitable for being triggered on activation of the network link with the network service of the terminal 18, i.e. when said service detects that the terminal 18 is connected to a network jack 24. It also includes a service 36 of presenting the ticket. Both of these are implemented by software modules In the terminal 18.

In a preliminary step, the operator 16 connects the terminal 18 to a jack 11 in a zone of the first type (restricted access) of the airplane network 24.

During a step 101, the ticket request service 32 of the terminal 18 determines whether the terminal already contains a ticket. It performs this verification, as triggered automatically by making the connection, with the memory 34 of the terminal. It is assumed below that the terminal 18 determines that it does not already contain a ticket.

During a step 102, the service 32 makes a request to the information system 10. This request includes a request for a ticket. The request is initiated automatically by the service 32 after it has performed the verification step. The service 32 then waits for a response from the system 10.

The ticket manager 20 is suitable for determining whether the jack from which the terminal 18 has sent the request presents a predetermined characteristic, specifically whether a table of the system 10 associates the jack with a number meaning that it is situated in a zone of type one. This amounts to determining whether it is a restricted access zone or not. During a step 103, it thus determines whether the ticket request is being made from a jack in a restricted access zone.

It is assumed below that the system 10 determines that this is indeed so. During a step 104, the ticket manager 20 creates a new ticket 30 and records it in the database 22. This ticket is unique and is obtained by a random number generator.

During a step 105, the ticket is sent to the ticket request service 32 of the terminal 18.

Conversely, if the system 10 receives a ticket request from a jack having a number that means that it is not situated in a zone of type one, then the ticket manager 20 responds to the terminal by sending it a refusal to dispense a ticket.

The ticket storage zone 34 in the terminal is designed to be accessible by the ticket request server 32 and by the ticket presentation service 36. During a step 106, the terminal stores the received ticket in the memory 34.

During a step 107, the operator disconnects the ticket 18 from the network 24.

In order to avoid any modification of the ticket so as to make it permanently valid, the information system 10 is the only system to manage the duration of ticket validity. For this purpose, during a step 108 triggered by disconnection, the ticket manager 20 creates a validity counter 31 that it associates with the newly-generated ticket 30. Thus, only disconnected terminals 18 have a validity counter associated with their respective tickets in the database 22. After that, the ticket manger 103 periodically monitors the validity of the ticket by comparing the duration given by the counter 31 with a predetermined duration. If the counter duration exceeds the predetermined duration, then the ticket has become invalid and the ticket manager 20 eliminates the ticket and also its counter from the database 22.

In parallel with creating the counter in the system 10, during a step 109, the ticket presentation service 36 of the terminal 18 also creates a validity counter 31 associated with the ticket. As in the system 10, the service 36 periodically monitors the validity of the ticket by comparing the duration displayed by the counter 31 with a predetermined duration. If the counter duration exceeds the predetermined duration, then the ticket becomes invalid and the service 36 eliminates the ticket together with its counter from the memory 34.

During a step 110, the operator, who has moved, connects the terminal once more to the system 10. It does not matter whether this connection takes place from a zone of the first type or a zone of the second type.

During a step 111, the ticket request service 32 determines whether the terminal already contains a ticket. It performs this determination via the memory 34. This determination is initiated automatically by the terminal after the connection stage.

When the ticket request service 32 has found and recovered a ticket, the ticket presentation service 36 of the terminal 18 sends the ticket to the authentication server 26 of the system 10. This ticket presentation is initiated automatically by the terminal after the stage of recording the ticket.

The authentication server 26 must be a service that is available. It has access to the database 22. During a step 113, after receiving the ticket transmitted by the terminal, the authentication server 26 determines whether a ticket identical to the ticket it has received is to be found in the database 22. Given the explanation above, if a given ticket is still present in the database, then that ticket is valid.

Thus, during step 114, the database 22 sends to the server 26 the result of comparing the received ticket with the ticket archived in the database.

If authentication fails, then the authentication server sends a negative response to the terminal 18.

In step 115, if authentication has succeeded, the authentication server 26 authorizes the terminal 18 to access the remainder of the airplane information system from the jack to which it is now connected.

When the operator 16 disconnects the terminal 18 once more from the jack 11, the system 10 and the terminal both create respective new counters for measuring the time interval until the next time the terminal is connected, if any.

When the ticket manager 20 detects that a ticket is no longer valid because its validity counter has expired, it eliminates the ticket together with its counter from the database 22. The same applies to the terminal 18 and the ticket presentation service 36.

This implementation thus causes a ticket to be created as a result of a ticket request being made automatically when the terminal 18 is connected, and after verifying that there is no ticket already therein.

Thereafter the ticket is dispensed, with the ticket being recovered automatically as a result of a request performed via a jack in a restricted access zone.

The problem of storing the ticket is solved by saving the ticket in the database 22 of the airplane information system, which database is accessible to the ticket management service 20 and to the authentication service 26, and also by serving it in the terminal so as to be accessible to the ticket presentation service 36.

This solution ensures that ticket validity is managed by a counter associated with each ticket that is under management for authentication by the ticket manager 20 of the system 10, and with a counter in the terminal so as to present the airplane information system only with a ticket that is valid.

This solution makes ticket presentation easier, with the ticket being sent automatically to the information system 10 once the ticket recovery stage has been performed.

It solves the question of space available in memory by automatically deleting the ticket as a result of a regular verification of ticket validity, as performed in the terminal 18 by the ticket presentation service 36, and also in the information system 10 by the ticket manager 20.

The information system 10 and the terminal 18 comprise one or microprocessors and one or more memories. The system 10 is generally made up of a plurality of computers. The terminal 18 constitutes a computer. It may be constituted by a laptop computer, a personal digital assistant (PDA), or a mobile telephone terminal.

All or some of the steps of the method of the invention may be controlled by a computer program. The program comprises code instructions suitable for controlling execution of said steps when executed on a computer. Provision may be made for the program to be recorded on a data recording medium such as a digital video disk (DVD), a flash memory device, or a hard disk. Such a program may be made available on the network 24 or on a telecommunications network that is independent of the aircraft so as to be available for downloading, e.g. for downloading updates.

Naturally, numerous modifications may be applied to the invention without going beyond the ambit thereof.

Provision may be made for the predetermined characteristics not to relate to a type of zone in which a connector is to be found nor to relate to a level of security associated therewith, although the invention is particularly advantageous under such circumstances. The type may also relate to the location of the zone (front or rear of the fuselage, top deck, bottom deck).

Zones of the first type (restricted access) are not necessarily in the front portion of the airplane as shown in FIG. 1. In practice, this may involve the cockpit and also crew rest zones (situated in the front portion of the airplane). However it is also possible to imagine that some or all of the restricted access zones are located for example in the rear portion of the aircraft (e.g. zones that are difficult to access because of their situation). It is thus possible to have one restricted access zone in the front portion and another restricted access zone in the rear portion.

The invention claimed is:

1. A method of accessing an on-board information system of an aircraft, wherein the system performs the following steps:
   receiving an authenticator request from an on-board connector of the aircraft, the connector being arranged for connecting a terminal to the system when the terminal is located in an aircraft zone of a predetermined type on the aircraft;
   determining whether the on-board connector presents a predetermined characteristic; and
   in the event that the on-board connector does indeed present the predetermined characteristic, sending an authenticator to the on-board connector.

2. A method in accordance with claim 1, wherein the system further performs the following steps:
   receiving an authenticator, the authenticator being sent from an on-board connector of the aircraft, the connector being arranged for connecting a terminal to the system when the terminal is on-board;
   determining whether the authenticator is valid; and
   in the event that the authenticator is indeed valid, authorizing access to the system from the on-board connector of the aircraft from which the authenticator was sent.

3. A method according to claim 2, wherein the system further performs triggering a counter measuring a time interval that has elapsed since a predetermined event, with the validity of the authenticator depending on the state of the counter.

4. A method according to claim 2, wherein the reception, determination, and authorization steps form a series of steps that are executed several times.

5. A method according to claim 1, wherein the system further performs comparing the received authenticator with an authenticator stored in the system.

6. A method according to claim 1, wherein the characteristic relates to a type of zone of the aircraft in which the on-board connector is located.

7. An aircraft, including an on-board information system suitable for:
   on receiving an authenticator request from an on-board connector of the aircraft, determining whether the on-board connector presents a predetermined characteristic, the connector being arranged for connecting a terminal to the system when the terminal is located in an aircraft zone of a predetermined type on the aircraft; and
   in the event that the on-board connector presents the predetermined characteristic, sending an authenticator to the on-board connector.

8. An aircraft according to claim 7, further comprising:
   on receiving the authenticator, determining whether the authenticator is valid, the authenticator being sent from an on-hoard connector of the aircraft, the connector being arranged for connecting a terminal to the system when the terminal is on-board; and
   in the event that the system determines that the authenticator is indeed valid, authorizing access to the system from the on-board connector of the aircraft from which the authenticator was sent.

9. A method of accessing an on-board information system of an aircraft, comprising:
   sending an authenticator request to the system, the sending being performed by a terminal located in an aircraft zone of a predetermined type on the aircraft;
   receiving and storing the authenticator by the terminal, the terminal being located in the aircraft zone;
   disconnecting the terminal from the system; and
   sending the authenticator to the system, the sending being performed by the terminal, when located in the aircraft zone or in another zone of the aircraft and once more connected to the system.

10. A method according to claim 9, further comprising, prior to sending the request, determining whether an authenticator is stored in the terminal, the determining performed by the terminal.

11. A method according to claim 9, further comprising triggering a counter measuring an interval of time that has elapsed since a predetermined event, with the validity of the authenticator depending on the state of the counter, the triggering being performed by the terminal.

* * * * *